United States Patent

Dwyer

[15] 3,653,929
[45] Apr. 4, 1972

[54] PROCESS OF FREEZE DRYING COFFEE

[72] Inventor: Daniel E. Dwyer, Westbury, N.Y.

[73] Assignee: General Foods Corporation, White Plains, N.Y.

[22] Filed: Oct. 21, 1969

[21] Appl. No.: 868,090

Related U.S. Application Data

[63] Continuation-in-part of Ser. No. 846,805, Aug. 1, 1969, and a continuation-in-part of Ser. No. 855,995, Sept. 8, 1969.

[52] U.S. Cl. ..................................99/199 C, 99/71, 62/58, 34/5
[51] Int. Cl. .......................................B01d 1/00, A23f 1/08
[58] Field of Search.....................99/71, 199 C; 34/5; 62/58; 23/273 F

[56] References Cited

UNITED STATES PATENTS

| | | | |
|---|---|---|---|
| 3,404,007 | 10/1968 | Muller | 99/199 |
| 2,509,681 | 5/1950 | Flosdorf | 99/71 UX |
| 3,438,784 | 4/1969 | Clinton et al. | 99/71 |
| 3,495,522 | 2/1970 | Muller | 99/71 |
| 3,482,990 | 12/1969 | Pluger | 99/71 |
| 3,293,766 | 12/1966 | Togashi et al. | 99/71 |
| 3,486,907 | 12/1969 | Hair et al. | 34/5 |
| 3,443,962 | 5/1969 | Elerath | 99/71 |

Primary Examiner—Norman Yudkoff
Assistant Examiner—Hiram H. Bernstein
Attorney—Gerald E. Jacobs, Bruno P. Struzzi and Michael J. Quillinan

[57] ABSTRACT

Percolated coffee extract is freeze concentrated, frozen, ground, and separated so that about 90 percent of the particles are sized from about 200–4,000 microns prior to freeze drying. Insoluble solids are removed either before or after freeze concentration. The ice separated in freeze concentration is melted, concentrated and returned to the processing stream to recover solids contained therein. The concentrated extract is bulked before freezing to facilitate control of its flow and to optimize its granular structure. Bulking is attained by inserting gas or fines or a combination thereof into the extract. The ground particles are screened prior to freeze drying, which is accomplished in two phases. The first phase has a high heat energy input at a platen temperature of 200°–250° F. and an absolute pressure of below 500 microns until a particle moisture content of about 40 to 50 percent by wt. is attained. The expression platen temperature as used herein means the temperature of the heated element (and heating medium therein) contacted directly or indirectly by the product being freeze dried, which is at a somewhat lower temperature. Then the absolute pressure is lowered to below 200 microns with a reduced heat input at a platen temperature of 100°–120° F. until a stable particle moisture content of about 1.0 to 2.5 percent by wt. is attained.

18 Claims, 1 Drawing Figure

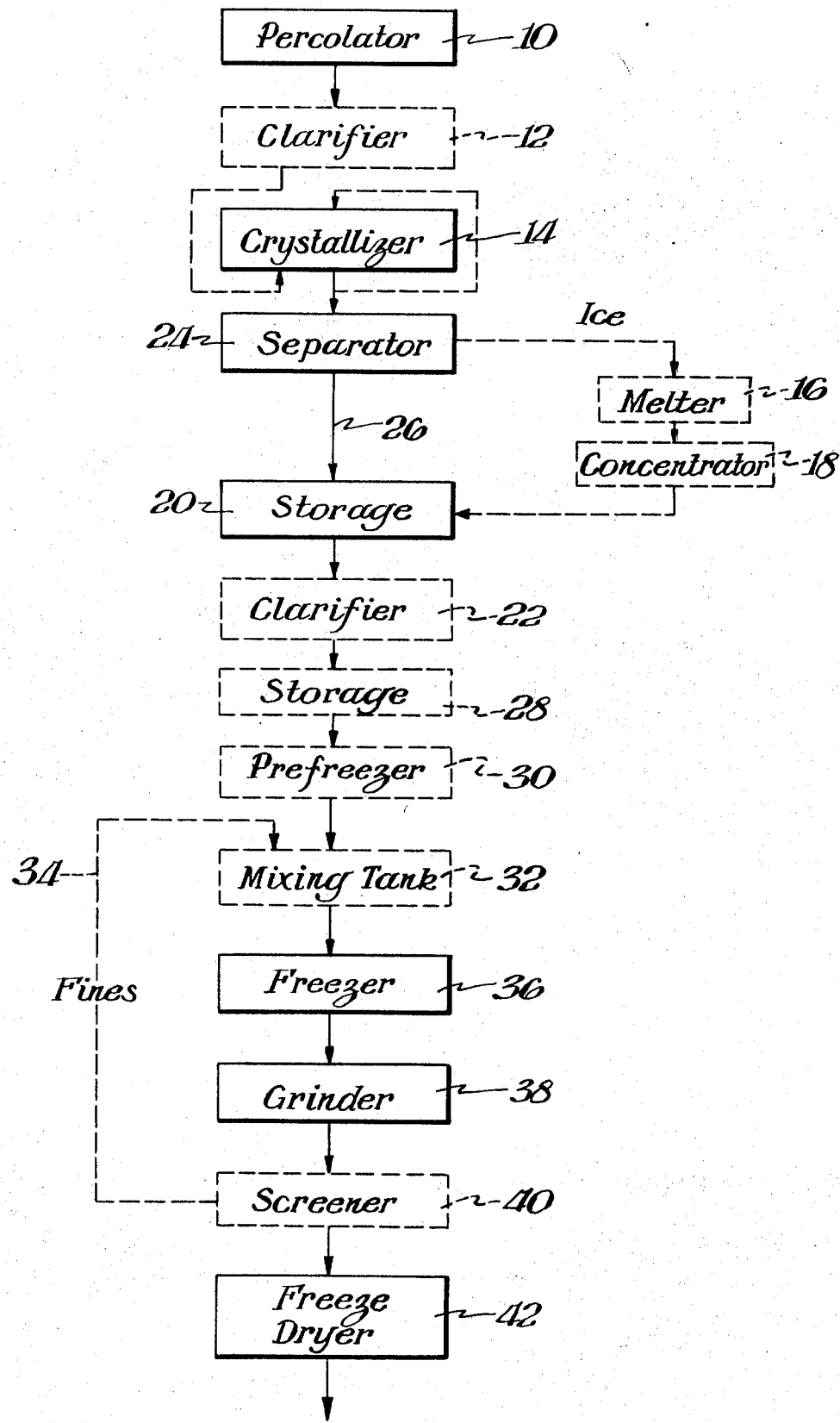

3,653,929

PROCESS OF FREEZE DRYING COFFEE

CROSS-REFERENCES TO RELATED APPLICATIONS, IF ANY

This application is a continuation-in-part of related applications for U.S. Pat. Ser. No. 846,805, filed Aug. 1, 1969, and Ser. No. 855,995, filed Sept. 8, 1969 by the same inventor.

BACKGROUND OF THE INVENTION

Various processes have been proposed for freeze drying coffee. The critical criteria are the flavor and color of the ultimate freeze dried coffee product and expense. An object of this invention is to provide an economical process for freeze drying coffee which makes the ultimate product flavorful and appealing in color.

SUMMARY

Percolated coffee extract is freeze concentrated, frozen, ground, and separated so that about 90 percent of the particles are sized from about 200–4,000 microns prior to freeze drying. Insoluble solids are removed either before or after freeze concentration. The ice separated in freeze concentration may be melted, concentrated and returned to the processing stream to recover solids contained therein. The concentrated extract may be bulked before freezing to facilitate control of its flow and to optimize its granular structure for grinding. Bulking may be attained by inserting gas or fines or a combination thereof into the extract. The ground particles may be screened prior to freeze drying to obtain the aforementioned fines and to obtain a uniform particle size for freeze drying. Freeze drying is accomplished in two phases with a high heat energy input at a platen temperature of 200°–250° F. and an absolute pressure of below 500 microns until a particle moisture content of about 40 to 50 percent by wt. is attained. Then the absolute pressure is lowered to below 200 microns with a reduced heat input at a platen temperature of 100°–120° F. until a stable particle moisture content of about 1.0 to 2.5 percent by wt. is attained.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single FIGURE is a schematic diagram of a process for freeze drying coffee which is an embodiment of this invention.

DESCRIPTION OF THE PREFERRED EMBODIMENTS

Coffee extract having a solids content of from 20 to 30 percent by weight is derived from a suitable means, such as percolator 10. Percolator 10 is for example operated at output temperatures approximately between 150° and 210° F. and provides typical coffee extract having a solids content of approximately 21 to 25 percent by weight. The percolated extract may have its relatively insoluble solids removed by clarifying system 12 to avoid fouling the surfaces of subsequent apparatus. System 12 is for example of the low temperature type which chills to below ambient room temperature and centrifuges under positive head pressures ranging from 20 to 80 p.s.i.g. to minimize foaming. Clarification may also be later accomplished as subsequently described herein.

The clarified extract then passes to crystallizer 14 for freeze concentration. Crystallizer 14 is any suitable heat exhanger in which the extract is frozen to form large discrete crystals in the body of the liquid and is, for example, operable under the following parameters. It is of the scraping blade type in which crystal nuclei are removed from the heat exchanger wall and thus individually grow within the liquid body. Discrete water ice crystals are grown to a size approximately from 10 to 80 mils within the crystallizer under the following parameters. These parameters include a temperature differential which grows a limited number of nuclei to a relatively large size in agitated areas of supercooled liquid. A freezing or crystallizer retention time of approximately 1 to 6 and more particularly from 1.5 to 3.5 hours provides a particularly rich concentrate of mother liquor containing substantially large, readily separable, relatively uniformly large and coarse ice crystals which may be readily pumped and handled.

Crystallizer 14 is designed to have a comparatively high ratio of volume of extract to refrigerated heat exchange surface. Residence time of extract in the crystallizer will be such as to assure gradual development of crystals in the extract at and in the vicinity of the refrigerated heat exchanger wall. Extract is subjected to a quiescent agitation by a stirrer in continuous positive scraping contact with the heat exchanger wall. Crystals, initially almost frost-like in dimension, form and serve to nucleate a comparatively large and grossly spherical water ice crystal in the body of the liquid. Generation of such crystals is induced by employing a slow feed rate, for example approximately 6 to 21 quarts per minute, while maintaining refrigerant in heat exchange relationship with the charged material in the crystallizer at temperatures at or below the ice point for the mother liquor solids concentration desired, which generally range between 29.4° F. ($-2°$ C.) and 19.4° F. ($-7°$ C.).

Residence time of extract in the crystallizer exceeds 1 hour and commonly is in the neighborhood of 1½ to 3½ hours. The ratio of crystallizer volume or the body of extract to the refrigerated heat exchange surface area is typically 1:1 and may range from 1:0.5 to 1:3.5 or more particularly from 1:0.75 to 1:1.50 thereby assuring a large volume of charged material, which when crystallized over a protracted period of time develops the desired large water ice crystals. Of consideration in this respect is the U factor, which is the amount of BTUs per hour, per square foot of refrigerated heat exchange surface area, per degrees F. Crystallizer 14 is designed and operated so that a U factor of between 25 to 100, more particularly from 35 to 75, and typically 50 is employed. This assures that ice crystals will be generated and grown at a fairly slow rate, thereby allowing currents of agitated supercooled extract to grow progressively larger crystals with a comparatively uniform final crystal size. On the other hand, the U factor is not so low as to occasion an impractical and prolonged holdup time in crystallizer 14.

Desired initiation of water ice crystals in supercooled extract is promoted by a heat exchanger having a crystallizing tank wall which is virtually wiped or scraped clean continuously so as to maximize heat transfer efficiency. The delta T (temperature differential) between extract and refrigerated heat exchanger or crystallization wall within the aforementioned parameters varies with the depth of extract in crystallizer 14. The extract per se becomes richer from the inlet point at the low extremity of crystallizer 14 as the extract is transferred upwardly and eventually decanted at the top of crystallizer 14 in the enriched mother liquor phase at solids contents ranging from 30 to 50 percent and commonly 35 to 45 percent. Mother liquor thus varies in ice point from 29.4° F. ($-2°$ C.) to 19.4° F. ($-7°$ C.) and lower as the extract concentration rises in crystallizer 14. Ultimately, water ice crystals collect as a floating slurry cap in the form of a centrally peeked mound. This floating cap is characterized by the aforesaid relatively uniform particle size distribution. Extract is agitated at a constant gentle stirring so as not to fracture or interfere with growth of coarse crystals.

In following the foregoing design and operating parameters, a delta T is practiced ranging generally between 30° and 70° F., more particularly 40° to 50° F. and commonly in the neighborhood of 45° F. Delta T in this application is a variable expression depending upon the solids contents of the liquor being crystallized, which in turn depends upon the soluble solids content thereof.

Throughout crystallization, an agitator continually dislodges nucleating crystals from the vessel walls by means of a scraper of suitable material, such as rubber. The crystallizer tank may be made of any common sanitary and non-reactive metallic surface, such as stainless steel. Extract is retained in the crystallizer for a period of 1 to 6 hours and usually from 1.5 to 3.5 hours.

Also throughout crystallization, extract is positively displaced in a substantially oxygen-free environment. Water ice crystals grown over the foregoing residence time ascend in the body of extract liquor, which is for all practical purposes comparatively foam-free and drawn off as an enriched readily pumped slurry.

Extract slurry is delivered from crystallizer 14 at a temperature in the neighborhood of less than 29.4° F. (−2° C.) and usually lower than 19.4° F. (−7° C.). Extract slurry is delivered for example through vibratory hoppers and feed pumps (not shown) to separator 24, which is for example a vertical batch basket-type centrifuge having a perforated basket of the type described in Perry's *Chemical Engineers' Handbook*, Fourth Edition, by McGraw-Hill Book Co., Inc., Copyright 1963, page 19–94, FIG. 19–145. The above type centrifuge provides liquor separation with low occlusion of soluble solids in the centrifuged ice cake. The extract is batch loaded into the centrifuge which undergoes a loading spin cycle developing G forces preferably not in excess of 400 G and at least 50 G. This is, for example, achieved by operating a centrifuge having a 48-inch diameter basket at an rpm in the neighborhood of 400 to 700 rpm. The coarse water ice crystals are built up into a cake serving as a filter medium of high porosity and permeability, which is accordingly spun to generate a stable ice structure during which part of the mother liquor is discharged through outlet line 26. Preferably, the centrifuge is operated 2 to 5 minutes and for a period of time sufficient to develop an ice cake thickness in the neighborhood of one-half to 2 inches, preferably about 1½ inches. The duration of the spin cycle is dependent upon extract concentration, which preferably is 35 to 45 percent soluble solids by weight.

During the latter part of the loading spin cycle, wash liquor is caused to flow through the ice cake and thereby washes the occluded solids into the discharge line. The remaining soluble solids may be recovered by washing either with dilute extract or wash water, which is fed through the cake during the latter part of the loading spin cycle, thereby increasing solids recovery.

Thereafter the aforementioned centrifuge is subjected to a final spin cycle at an elevated G force in excess of 500, attained by spinning in excess of 900 rpm whereby additional mother liquor is freed from the cake and the cake is further depleted of occluded soluble solids. The ice cake solids content after this final spin is generally less than 5 to 10 percent and more usually in the neighborhood of 1 to 3 percent by weight. Finally, the centrifuged ice cake is plowed from the centrifuge and discharged through other lines, for example, to heated melt tank 16. The melt ice liquor may be delivered to a concentrator 18 for concentrating the liquor to a solids content in the neighborhood of 35 to 45 percent. The concentrated liquor may be directed back into the main stream of the process described herein, namely into storage tank 20.

For some applications, it may be desirable to further concentrate the extract thereby optimizing utilization of subsequent drying equipment. In such applications, it may be practicable to further concentrate extract to as high a solids content as 50 percent by weight. This may be accomplished, for example, by a higher heat exchanger rate scrape wall heat exchanger system, such as a Votator-type crystallizer (not shown). See *Chemical Engineers' Handbook* by Perry, Fourth Edition, Copyright 1963, McGraw-Hill Book Co., Inc., page 17–17. This secondary crystallizer is operated at high heat exchange rates as well as scraping rates and thus functions to generate fine ice crystals with a high delta T and brief residence time in its heat exchanger barrels. The extract discharging therefrom is fed by pump to a basket-type centrifuge of the same type previously described and also operated as described. Ice from the centrifuge may also be discharged into a melt ice liquor tank for extract concentration as aforesaid.

Generally, it is preferred not to employ a second freeze concentration system of the type just described above and instead to prepare a mother liquor of high solids concentration by the single crystallization previously described, thereby achieving a target mother liquor of between 35 and 45 percent soluble solids by weight. However, where a feed of lower soluble liquor concentration is employed, the secondary high heat exchange rate scrape wall heat exchange system may be employed as desired to increase soluble solids content to within the aforesaid range and to as high as 50 percent by weight.

Concentrated extract at a solids content of between 35 to 50 percent by weight is held for a period less than 4 hours and commonly less than 3 hours in storage tank 20 and is then delivered to the next phase of instant coffee production, which for example includes a belt freezing system of the type shown in U.S. Pat. No. 3,253,420. The frozen pieces of extract from the aforementioned belt freezing system may be broken up and dried in a freeze drying unit of suitable type to provide ultimate instant coffee product.

Prior to freezing, clarification may be accomplished in clarifier 22 if aforementioned clarifier 12 is not utilized. The combined concentrated extract having a solids content of approximately 30 to 50 percent by weight is inherently at a temperature of approximately 26° to 28° F. entering storage tank 20 by virtue of its freeze concentration. These low temperatures tend to precipitate and agglomerate the insoluble solids. If these solids are not removed before freeze drying, they speckle the ultimate product with undesirable black spots. Such solids are easily removed in clarifier 22 after slightly heating to a temperature of about 60° to 70° F. in storage tank 20. Clarifier 22 is for example a closed feed and discharge disk bowl centrifuge of the type described above as in Perry's *Chemical Engineers' Handbook*, Third Edition, Copyright 1950, page 1,000, FIG. 106.

Concentrated extract having a solids content of about 30 to 50 percent by wt. is held in storage tank 28 for a short period less than 4 hours and usually less than 3 hours at a temperature under or about 10° C., which usually ranges from about 0° to 10° C. Extract from tank 28 is delivered to prefreezing heat exchanger 30 which cools it to the neighborhood of the extract freezing point which varies from −2° to −7° C. for usual concentrates. The temperature of prefreezer 30 is regulated to merely chill or to provide small ice crystals to help vary the available amount of fines.

A foaming agent, such as air or a nonoxidizing inert gas-like nitrogen, may be introduced into the cold concentrate to initiate foaming or later into mixing tank 32 to adjust the bulk density for a given amount of fines. Such gas injection is however usually not necessary to obtain the later described important features of this invention.

Cold concentrated coffee extract is supplied to mixing tank 32. Mixing tank 32 is also maintained at about the extract freezing point (from about −2° to −7° C. for usual concentrations). Fines of frozen coffee extract (derived from downstream grinding operation prior to freeze drying later described) are added back to the process into mixing tank 32 through line 34. A considerable amount of the ultimate mixture is constituted by this addback of fines, which thus remarkably homogenizes the ultimate mixture and maintains its solids content uniform. Amounts ranging from 10 to 40 percent and preferably from 25–35 percent of the ultimate mixture are thus advantageously employed.

The fines are added to the liquid extract in tank 32 down through its free surface together with ambient atmosphere with controlled turbulence and intimately mixed throughout the extract. This forms a frothy viscous soluble ice extract slurry in mixing tank 32 having relatively large bubbles and highly controllable flow characteristics. Intermixture is effectively accomplished by suitable mixing apparatus (not shown) utilizing for example, paddle and/or screw impellers which extend through the free surface of the liquid extract and carry the fines and ambient atmosphere down through it to intimately mix them homogeneously within the body of the liquid extract. The near freezing temperature in mixing tank 32 preserves the frozen fines, their inherently uniform solids content and their resultant action on the intermixed extract to maintain its solids content remarkably uniform during freezing. The combination of these phenomena provides a frothy viscous soluble ice extract slurry in mixing tank 32 having a remarkably homogeneous solids content throughout, substantially uniform bulk density or overrun (for example 0.5 to 0.85 gram/cc or from 0.6 to 0.75 gram/cc) having highly controllable viscous flow characteristics with relatively large bubbles. The aforementioned characteristics are usually attained without any injected gas either before or during mixing. Some gas may however be added if desired through an injector as previously described or through a gas injecting line (not shown) connected to mixing tank 32. The density of the slurry may be adjusted by varying the speed of rotation of the mixing apparatus (not shown).

The frothy viscous ice extract slurry is withdrawn from mixing tank 32 and uniformly discharged through line into freezer 36. Freezer 36, is for example, a slab freezer of the belt type described in U.S. Pat. No. 3,253,420. The controllable flow state of the frothy viscous ice extract slurry deposited on belt slab freezer 36 facilitates its deposition in a uniformly thick layer throughout the full width of the freezing belt with a substantially uniform bulk density. The ice extract slurry of this invention also promotes formation of a granular frozen slab structure, which provides highly uniform particles of advantageous shape and size for freeze drying as well as the considerable amount of fines useful for the previously described addback. Residence in freezer 36 ranges from 10 to 60 minutes and is typically 30 minutes. It is advantageous to slowly cool the product to a temperature below its eutectic point, typically less than −20° C. (−4° F.) and advantageously about −30° C. (−22° F.) or slightly lower.

Frozen extract is tangentially removed from the freezing belt by passage over a suitable slab breaker (not shown) whence the broken chunks are conveyed to a grinder or mill 38 having primary, secondary and tertiary stages wherein the frozen extract is ground to an ultimate particle size. This ultimate particle size may be attained in screener 40. The ultimate particle size is such that at least 90 percent by weight and more particularly from about 90–95 percent by wt. will have a particle size of about 200–4,000 microns. Such content of particles from about 500–2,000 microns is advantageous and particularly between 600 and 1,500 microns.

Overs are recirculated and reground in mill 38 to help maintain the aforementioned uniform particle size distribution. Fines recovered from primary, secondary and tertiary grinding are recirculated to mixing tank 32 as aforesaid through line 34 with the aforementioned many unexpected advantages. These advantages also include minimizing the amount of troublesome dust.

The resultant particle structure also enhances the ultimate flavor of the ultimately freeze dried coffee particles as a result of the aforementioned uniquely uniform solids content and for other reasons which might not be fully understood. The use of freeze concentrated extract also contributes to the uniquely palatable flavor of the ultimate freeze dried product. The ultimate product of freeze dried coffee also has an unusually dark color which is extremely desirable. This is probably due to the relatively large bubbles created by the aforementioned blending of fines and ambient atmosphere (for example, air) down through the free surface of the liquid extract with controlled turbulence. Such bubbles are relatively larger than those created by injected gas which endow the ultimate product with an undesirably lighter color.

Freeze dryer 42 is of conventional tunnel type equipped with a plurality of essential condensers (not shown) and adapted to receive loaded carriers of frozen particles in a semi-continuous freeze drying operation. Charged tray loads at one-half inch to 4 inch depth are loaded into the tunnel whereafter the freeze drying cycle commences until water has been effectively removed therefrom to a moisture content of 1 to 2½ percent.

The major weight percent of coffee granules being freeze dried have a coarse particle size in order to maximize production capacity consistent with unavoidable loss of soluble coffee powder due to entrainment. Thus, in the semicontinuous freeze dryer shown, frozen coffee extract having an average particle size of over 90 percent thereof ranging between 200 and 4,000 microns and preferably between 500 and 1,500 microns. By virtue of the mass of such coarse particles and even though the density is reduced by foaming as aforesaid, the particles loaded onto the trays of the carrier may be practically subjected to lyophilization conditions.

The coarse coffee granules are freeze dried in the aforesaid semicontinuous freeze dryer, which pressure is initially below 500 microns in order to assure a minimum of any melt-back of extract due to remelting or rewarming of particles to above the eutectic point. In a continuous freeze drying operation, the condenser temperature practiced is well below said eutectic temperature and generally is initially maintained below −40° F., more typically at −50° F. During the initial stages of water removal, it is feasible to employ high heat energy inputs due to the cooling effects caused by high mass evaporation of water vapor which is most readily removed as "free" water and until a particle moisture content between 40 to 50 percent is approached. In this way, the freeze drying cycle is foreshortened. Practically speaking, a platen temperature and a heat exchange fluid temperature ranging upwardly as high as about 200° to 250° F. is employed to effect said water removal during the initial stages of freeze drying. By reason of the coarse particle size specified and the substantial absence of fine particles, the high mass transfer practiced does not occasion undue entrainment of particles despite high heat energy inputs thereto. Generally, this period of high mass transfer ranges under the conditions specified over a period of 2 to 4 hours.

Thereafter, the heat profile of the particles per se and the heating medium circulating through the freeze drying platens as the charge of loaded trays is carried through the chamber are controlled so as to effect a progressively lower temperature than 200° F. It is preferred to lower the platen temperature progressively to about 100° to 120° F. (preferably 110° F.) while effecting a continuation of the dehydration operation until moisture content of the particles has been reduced to between 1.0 and 2.5 percent. The temperature of the product itself is somewhat lower than the platen temperature. During this latter phase of operation, the condenser temperature is lowered to below −50° F., such as to about −60° F. and the absolute pressure in any event lowered to below 200 microns. These terminal lyophilization conditions are practiced after a moisture reduction to 40 to 50 percent has been achieved in the particles.

The freeze drying chamber is preferably released to atmosphere upon termination of the moisture reduction to the aforesaid stable moisture content of 1.0 to 2.5 percent by adjusting nitrogen in a purified condition, that is, substantially free of water. In any event, the freeze dried coffee is held at temperatures, preparatory to and during holding and packing the particles, to maintain substantially below 2.5 percent moisture.

The foregoing process described pertaining to a continuous freeze drying operation may also be practiced in a batch operation, in which case the temperature profile is similarly elevated for product temperature and freeze drying platen temperature to as high as from 200° to 250° F. until the major percent of moisture present in the coffee particles is removed. Thereafter, the coffee extract is further dehydrated at reduced platen temperatures and the final 40–50 percent moisture is removed while maintaining a product temperature preferably below 120° F. Throughout this operation, absolute pressures vary, but are at all times below 500 microns and are reduced upon removal of the major weight percent of the water present to below 200 microns.

By practicing the foregoing freeze drying parameters, coffee granules are lyophilized with a minimum melt-back and hence avoid any loss of the desired flavor values due to foaming of the particles. At the same time, the benefits of freeze concentration may be fully realized in that the load of moisture to be removed by lyophilization is significantly reduced. Freeze drying is practiced over a period of time less than 16 hours, and depending upon the ability to program heat input with minimum entrainment, may be reduced to as low as 5 hours. Such freeze drying is employed on foamed or nonfoamed coffee extract and the extent of concentration of extract by freeze drying methods aforesaid can be varied within the ambit of the invention described.

I claim:

1. A process of preparing freeze dried coffee comprising the steps of obtaining relatively unconcentrated coffee extract having a solids content of approximately 20–30 percent by wt., freeze concentrating said extract to provide a relatively concentrated coffee extract having a solids content of approximately 30–50 percent by wt., freezing the concentrated extract, comminuting the frozen extract to provide frozen particles of which at least about 90 percent by wt. range in size approximately from 200–4,000 microns, and freeze drying said particles in a freeze dryer having a platen and condenser under the following conditions:
   a. initially, employing high heat energy input at a platen temperature of about 200°–250° F. and an absolute pressure below about 500 microns until a particle moisture content of about 40–50 percent by wt. is attained, and
   b. finally, lowering the heat energy input at a platen temperature between about 100°–120° F. and an absolute pressure of below about 200 microns until a stable particle moisture content of about 1.0 to 2.5 percent by wt. is attained.

2. A process as set forth in claim 1 wherein said freeze drying is accomplished in from about 10–16 hours.

3. A process as set forth in claim 1 wherein said condenser temperature in step (a) is maintained at approximately −50° F.

4. A process as set forth in claim 1 wherein said platen temperature in step (a) is maintained at about 200° F.

5. A process as set forth in claim 1 wherein said platen temperature in step (b) is maintained below about 110° F.

6. A process as set forth in claim 5 wherein said condenser temperature in step (b) is lowered to below −50° F.

7. A process as set forth in claim 1 wherein said absolute pressure in step (a) is below about 250 microns.

8. A process as set forth in claim 1 wherein said particle size ranges approximately from 500–1,500 microns.

9. A process as set forth in claim 1 wherein the density of said concentrated extract is adjusted prior to freezing.

10. A process as set forth in claim 9 wherein said density is adjusted to range approximately from 0.5 to 0.85 gram/cc prior to freezing.

11. A process as set forth in claim 10 wherein said bulk density is adjusted by inserting ice crystals or gas within said concentrated extract.

12. A process as set forth in claim 11 wherein said ice crystals are inserted by freezing or inserting fines of frozen extract.

13. A process as set forth in claim 12 wherein said gas is inserted by either injecting gas or entraining it with said fines.

14. A process as set forth in claim 1 wherein said extract is clarified to remove undesirable solids therefrom prior to freezing.

15. A process as set forth in claim 1 wherein freeze concentration is accomplished in a manner which provides relatively large and uniform ice crystals ranging approximately from 20 to 80 mils in size.

16. A process as set forth in claim 1 wherein the freeze concentration of said extract yields an effluent of ice and concentrated extract, said ice and concentrated extract being separated in two centrifuge phases including a relatively low speed loading phase and a relatively high speed loading phase and said ice being washed during the latter portion of said loading phase to help remove coffee solids therefrom.

17. A process as set forth in claim 16 wherein said loading phase develops forces ranging approximately from 50 to 400 Gs. and said terminal phase develops forces ranging in excess of approximately 500 Gs.

18. A process as set forth in claim 17 wherein said 50 to 400 G forces are developed at about 400 to 700 rpm and said G forces in excess of 500 are developed at over 900 rpm.

* * * * *